United States Patent [19]

Otani et al.

[11] Patent Number: 4,515,981
[45] Date of Patent: May 7, 1985

[54] POLYETHERPOLYOL DERIVATIVE AND PROCESS FOR PREPARING THE SAME

[75] Inventors: Kozo Otani, Hyogo; Yoshio Yamada, Osaka, both of Japan

[73] Assignee: Toyo Tire & Rubber Company, Limited, Japan

[21] Appl. No.: 533,871

[22] Filed: Sep. 20, 1983

[30] Foreign Application Priority Data

Sep. 21, 1982 [JP] Japan .................. 57-165447

[51] Int. Cl.$^3$ ........................................... C07C 101/56
[52] U.S. Cl. .................................................. 560/50
[58] Field of Search ........................................... 560/50

[56] References Cited

U.S. PATENT DOCUMENTS 4,328,322  5/1982  Baron ........................ 521/163

FOREIGN PATENT DOCUMENTS 580886  8/1959  Canada ....................... 560/50
306565  6/1955  Switzerland .................. 560/50

OTHER PUBLICATIONS

Beilstein, *Organische Chemie*, band 14, System Number 1872–1928, p. 420, Springer–Verlag, 1931.

*Primary Examiner*—Michael L. Shippen
*Assistant Examiner*—Bruce D. Gray
*Attorney, Agent, or Firm*—Murray, Whisenhunt and Ferguson

[57] ABSTRACT

A polyetherpolyol derivative having at least, on average, one terminal amino group in which at least, on average, one hydroxyl group is substituted by a residue of para-aminobenzoic acid ester, and having the general formula

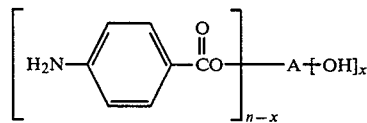

wherein n is an integer of 2 to 8, x is an average value and a positive number of 0.05n to (n−1), A is an n-valent radical obtained by removal of hydroxyl groups from an n-valent polyoxyalkylenepolyol having a molecular weight of 400 to 10,000.

1 Claim, No Drawings

POLYETHERPOLYOL DERIVATIVE AND PROCESS FOR PREPARING THE SAME

The invention relates to a para-aminobenzoate derivative of a polyetherpolyol having at least one terminal amino group.

Polyetherpolyol derivatives having para-aminobenzoate groups in a part of the ends of the molecules provide a polyurethaneurea by a polyaddition reaction with a polyisocyanate and provide a polyesteramide by a polycondensation reaction with a polycarboxylic acid. The polyetherpolyol derivative is useful for starting materials of an elastomer, plastics, etc, having an excellent mechanical strength and high heat resistance, and also is usable as an initiator for ring-opening polymerization of epoxy compounds.

With respect to a polyether having a terminal amino group, for example, Japanese Unexamined Patent Publication (Kokai) No. 5,245/1971 discloses a process for preparing an anthranilic acid ester of a polyether by a reaction of a polyetherpolyol with an isatoic acid anhydride in the presence of a strong base such as sodium hydroxide. However, this method relates to a preparation of a polyether having an ortho-amino group, and a polyether having a para-amino group can not be prepared by this method. In order to obtain an elastomer or plastics having a greater mechanical strength and higher heat resistance with use of, as a starting material, a polyether having a terminal amino group, it is more preferable to employ a para-amino compound such as para-amino-benzoate than an ortho-amino compound such as anthranilic acid ester.

Japanese Kokai No. 132,096/1975 discloses a bis(para-amino-benzoate) of propanediol or pentanediol. These amino compounds have low molecular weight and prepared by a multi-process comprising a reaction of a diol with a para-nitrobenzoyl chloride and a reduction of a product to a corresponding diamine. Thus, this method is not applicable to a preparation of a polyetherpolyol having a high molecular weight.

U.S. Pat. No. 4,328,322 discloses a para-amino benzoate of a polyol in which all of the terminal hydroxyl groups of the polyol are replaced by amino-containing groups, by a reaction of a polyol with para-nitrobenzoic chloride and a reduction of nitro groups to amino groups.

Contrary to this, the present polyetherpolyol is a para-amino benzoate of a polyetherpolyol in which a part of the terminal hydroxyl groups of the polyol are replaced by amino containing groups. The present polyetherpolyol has hydroxyl groups and entirely differs in chemical structure from the polyamine disclosed in the above U.S. Patent.

The polyetherpolyol of the invention possesses both amino and hydroxyl groups on each end of the molecule and thus is employable for a wide use. Further, the polyetherpolyol of the invention can be prepared by a single process of transesterification reaction in a high yield without purification. On the other hand, the polyamine of the above U.S. Patent is prepared by a two-stage process of an esterification with use of acid chloride and a reduction of nitro group, with requiring purification.

An object of the invention is to provide a polyetherpolyol derivative having amino and hydroxyl groups on each end of the molecule and a process for preparing the same by a simple single-stage process.

The invention provides a polyetherpolyol derivative having at least, on average, one terminal amino group in which at least, on average, one hydroxyl group is substituted by para-aminobenzoic acid ester, and having the general formula

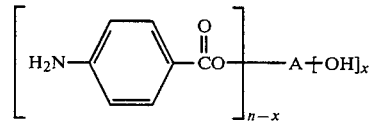

wherein n is an integer of 2 to 8, x is an average value and a positive number of 0.05n to (n-1), A is an n-valent radical obtained by removal of hydroxyl groups from an n-valent polyoxyalkylenepolyol having a molecular weight of 400 to 10,000.

The invention also provide a process for preparing the polyetherpolyol derivative having the above formula which comprises reacting one mole of an n-valent polyoxyalkylenepolyol having a molecular weight of 400 to 10,000 with 0.125n to n moles of para-aminobenzoic acid alkyl ester.

Examples of preferable polyoxyalkylenepolyol of the invention include 2- to 8-valent polyetherpolyols having a molecular weight of 400 to 10,000. These polyols can be obtained by a known process. For example, these polyols are prepared by polyaddition reaction of at least one alkylene oxide such as ethylene oxide, propylene oxide, tetrahydrofuran, etc in any order, in the presence of a suitable initiator such as water, low molecular weight polyol or amine, etc.

Examples of useful low molecular weight polyols as an initiator are ethylene glycol, propylene glycol, 1,4-butandiol, 1,6-hexanediol, glycerin, trimethylolpropane, pentaerythritol, sorbitol, sucrose, hydroquinone, 2,2-bis(4-hydroxyphenyl)propane, etc. Examples of useful low molecular weight amines are methylamine, butylamine, ethylenediamine, aniline, tolylenediamine, alkanolamines such as ethanolamine, diethanolamine, triethanolamine, etc.

Among the above polyoxyalkylenepolyols, preferable are 2- to 3-valent polyoxytetramethylene glycol, polyoxypropylenepolyol, polyoxypropylenepolyoxyethylenepolyol, etc having a molecular weight of 1,000 to 4,000, when the resulting polyetherpolyol derivative having at least one terminal amino group of the invention is used as a starting material for an elastomer. Further, 3- to 8-valent polyoxyalkylenepolyols having a molecular weight of 400 to 1,500 are preferable, when the polyetherpolyol derivative of the invention is used as a starting material for a plastic.

Examples of useful para-aminobenzoic acid alkyl esters are methyl, ethyl, isopropyl, n-propyl, isobutyl, n-butyl, t-butyl, isoamyl esters of the acid. Especially preferable are methyl and ethyl esters thereof.

The polyetherpolyol of the invention can be prepared by a simple single-stage process of subjecting the above 2- to 8-valent polyoxyalkylenepolyol having a molecular weight of 400 to 10,000 and the alkyl para-aminobenzoate to transesterification reaction with removing the resulting alcohol.

The polyetherpolyol of the invention is a partial ester having unreacted hydroxyl groups. The esterification ratio, namely amine conversion ratio may be in a wide range depending on the use. It is essential that at least, on average, one hydroxyl group of the polyetherpolyol is subjected to esterification and the esterification ratio is preferably about 50 to 95%. Accordingly, the polyetherpolyol of the invention is prepared preferably by reacting one mole of n-valent polyoxyalkylenepolyol and 0.125n to n moles of alkyl para-aminobenzoate.

The transesterification reaction is carried out with or without a known esterification catalyst, preferably in a stream of an inert gas such as nitrogen. The reaction proceeds usually at 150° to 250° C. with removing an alcohol. Weak acid or weak basic catalyst is preferable which does not produce an ether or olefin by dehydration of a polyol. Examples of useful catalysts are antimony trioxide, lead monoxide and like metal oxide, tetraisopropyl titanate, tetrabutyl titanate and like organic titanium compounds, calcium acetate and like alkaline earth metal salt of weak acids, among these most preferable being organic titanium compounds. The amount of catalyst is usually up to 1000 ppm, preferably up to 100 ppm. An inert solvent and antioxidant such as triphenyl phosphate may be usable in the reaction. The reaction is continued until the distillation of alcohol is completed. The polyetherpolyol derivative is obtained without purification by removing from the reaction mixture the remaining alcohol and, if present, excess of alkyl para-aminobenzoate.

The invention will be described in detail with reference to the following examples.

EXAMPLE 1

Into a three-necked flask were placed 545 g (0.364 mole) of polyoxytetramethylene glycol (trade name, PTMG 1500, MW 1498, a product of Mitsubishi Chemical Industries Ltd.), 120 g (0.728 mole) of ethyl para-aminobenzoate (Reagent grade, a product of Nakarai Chemical Co., Ltd.) and 0.033 g of tetrabutyl titanate. The mixture was heated under a stream of dry nitrogen gas. Ethanol began to be distilled at 180° C. The temperature was gradually increased and the distillation of ethanol stopped at 200° C. in an amount of 82% of the theoretical amount. The mixture was further maintained at 215° C. for 2 hours. Unreacted ethyl para-aminobenzoate was distilled off under a reduced pressure to obtain 622 g of a light yellow liquid having a viscosity of 6200 cps at 27° C.

An amine value of the product was 1.045 meq/g by a titration with use of perchloric acid in glacial acetic acid according to Handbook of Japan Analytical Chemistry, third edition, page 261. A total amount of amino group and hydroxyl group was 1.172 meq/g by a method described in JIS K 1557. Analysis of the product with gel permeation chromatography showed no free ethyl para-amino-benzoate. The product is identified by a single peak and the distribution of molecular weight is almost same as that of the starting PTMG 1500. Accordingly, 89.2% of terminal hydroxyl groups of PTMG 1500 was converted to amino groups.

EXAMPLE 2

The procedure was repeated in the same manner as in Example 1 with use of 568 g (0.292 mole) of polyoxypropylene glycol capped with ethylene oxide at the end of the molecule (trade name, ED 56, MW 1944, a product of Mitsui Nisso Urethane Co., Ltd.), 93.2 g (0.564 mole) of ethyl para-aminobenzoate and 0.04 g of tetrabutyl titanate. A yellow liquid was obtained in a yield of 624 g which has a viscosity of 1890 cps at 27° C.

An amine value of the product was 0.804 meq/g. A total amount of amino group and hydroxyl group was 0.934 meq/g. Thus, 86.1% of terminal hydroxyl groups of the starting polyol was converted to amino groups.

EXAMPLE 3

The reaction was conducted in the same manner as in Example 1 with use of 489 g (0.337 mole) of polyoxyethylene glycol (polyethylene glycol #1540, MW 1450, Nakarai Chemical Co., Ltd.), 112 g (0.678 mole) of ethyl para-aminobenzoate, 0.06 g of tetrabutyl titanate and 0.6 g of triphenyl phosphate (antioxidant, a product of Nakarai Chemical Co., Ltd.).

The mixture was reacted at 250° C. for 5 hours. A yellow waxy solid (at room temperature) was obtained in a yield of 557 g which has a melting point of 35° to 40° C. and a viscosity of 720 cps at 45° C.

The product has an amine value of 0.973 meq/g. A total amount of amino group and hydroxyl group was 1.210 meq/g. Thus, 80.4% of terminal hydroxyl groups of the starting polyol was converted to amino groups. The product was dissolved in water as well as the starting polyoxyethylene glycol.

EXAMPLE 4

The reaction was carried out in the same manner as in Example 1 with use of 107.5 g (0.25 mole) of 3-valent polyoxypropylenepolyol prepared by use of trimethylolpropane as an initiator (trade name, T-400, MW 430, a product of Adeka Ltd.), 124 g (0.75 mole) of ethyl para-aminobenzoate, 0.023 g of tetrabutyl titanate and 1.2 g triphenyl phosphate. The mixture was reacted at 250° C. for 7 hours. A brown soft solid (at room temperature) was obtained in a yield of 189 g which has a viscosity of 28000 cps at 65° C.

The product has an amine value of 3.19 meq/g. A total amount of amino group and hydroxyl group was 3.78 meq/g. Thus, 84.4% of terminal hydroxyl groups of the starting polyol was converted to amino groups.

EXAMPLE 5

The procedure was repeated in the same manner as in Example 1 with use of 560 g (0.374 mole) of the same polytetramethylene glycol (PTMG 1500) as used in Example 1 and 74 g (0.448 mole) of ethyl para-aminobenzoate. A light yellow liquid was obtained in a yield of 611 g which has a viscosity of 4120 cps at 25° C.

The product has an amine value of 0.684 meq/g. A total amount of amino group and hydroxyl group was 1.230 meq/g. Thus, 55.6% of terminal hydroxyl groups of the starting polyol was converted to amino groups.

We claim:

1. A polyetherpolyol derivative having at least one terminal amino group in which at least one hydroxyl group is substituted by a residue of para-aminobenzoic acid ester, and having the formula

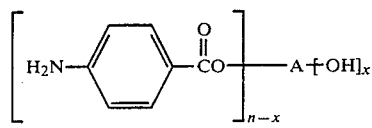

wherein n is an integer of 2 to 8, x is a positive number of 0.05n to (n−1), A is an n-valent radical obtained by removal of hydroxyl groups from an n-valent polyoxyalkylenepolyol having a molecular weight of 400 to 10,000.

* * * * *